United States Patent [19]

Pedersen et al.

[11] Patent Number: 5,305,442
[45] Date of Patent: Apr. 19, 1994

[54] GENERALIZED HIERARCHICAL ARCHITECTURE FOR BUS ADAPTERS

[75] Inventors: Derald A. Pedersen, Apple Valley; James A. Dahlberg, Eagan, both of Minn.

[73] Assignee: Ceridian Corporation, Minneapolis, Minn.

[21] Appl. No.: 858,698

[22] Filed: Mar. 27, 1992

[51] Int. Cl.$^5$ .............................................. G06F 13/14
[52] U.S. Cl. ...................... 395/325; 364/230.4; 364/240.5; 364/DIG. 1; 364/942.4; 364/931.44; 364/926.91; 364/DIG. 2
[58] Field of Search .................. 395/325, 275; 364/230.4, 240.5, DIG. 1, 942.4, 931.44, 926.91, DIG. 2

[56] References Cited

U.S. PATENT DOCUMENTS

| | | | |
|---|---|---|---|
| 4,471,427 | 9/1984 | Harris | 395/275 |
| 4,604,685 | 8/1986 | Brown et al. | 364/200 |
| 4,814,979 | 3/1989 | Neches | 364/200 |
| 4,837,677 | 6/1989 | Burrus, Jr. et al. | 364/200 |
| 4,949,338 | 8/1990 | Albal et al. | 370/85.6 |
| 4,953,081 | 8/1990 | Feal et al. | 364/200 |
| 4,954,945 | 9/1990 | Inoue | 364/200 |
| 4,979,097 | 12/1990 | Triolo et al. | 395/325 |
| 5,029,074 | 7/1991 | Maskas et al. | 364/200 |

Primary Examiner—Michael R. Fleming
Assistant Examiner—Glenn A. Auve
Attorney, Agent, or Firm—Kinney & Lange

[57] ABSTRACT

A top state controller controls a bus adapter to a selected master or slave top state in response to a command on a local or system bus during a dispatch state of the bus adapter. The bus adapter remains in the selected top state until the command is completed or suspended, whereupon it returns to the dispatch state. The top state controller sets a first flag upon a change from a master top state to the dispatch state in response to suspension of a command by a data handling device, and sets a second flag upon a change from a slave top state to the dispatch state upon completion of a command. The top state controller is responsive to the first or second flag to operate the bus adapter to that master top state from which the bus adapter changed to set the first flag and is responsive to the completion of the suspended command to clear the first and said second flags. The controlled bus adapter and top state controller permit resolution of deadlock conditions and establish priorities between the local and system buses, and permit suspension of the master states to respond to slave commands.

12 Claims, 8 Drawing Sheets

VBAC DATA PATHS (DP2)

VBAC DATA PATHS (DP3)

Fig. 4D

VBAC ARBITRATION AND INTERRUPTS

Fig. 5

GENERALIZED HIERARCHICAL ARCHITECTURE FOR BUS ADAPTERS

BACKGROUND OF THE INVENTION

The present invention relates to bus adapter architectures which provide an interface between two different types of data communication buses.

Bus adapters function to bridge together two different types of data communication buses, such as a local bus used to communicate to devices within a single module and an external or system bus used to communicate to other modules in a system. Previous bus adapters included distributed control mechanisms by which each interface or major operation category included a separate control section. Unique interfaces between the multiple control sections implemented common resource allocation, operation prioritization, and deadlock recovery functions. Previous bus adapters selected the functions to be performed and resolved each uniquely on a case by case basis. Previous bus adapters lacked definition for combinations of functions and timing relationships between the multiple control sections and were thus difficult to simulate and validate. Consequently, previous bus adapters were prone to latent faults.

SUMMARY OF THE INVENTION

A top level state controller machine enables and controls a plurality of substate units. Each substate unit performs translation of protocols between the different types of buses. The top state controller transitions a bus adapter to a selected master or slave top state in response to a command on the local or system bus during a dispatch state of the bus adapter. The bus adapter remains in the selected top state until the command is completed or suspended, whereupon it returns to the dispatch state. The top state controller sets a first flag upon a change from a master top state to the dispatch state in response to suspension of a command by a data handling device, and sets a second flag upon a change from a slave top state to the dispatch state upon completion of a command. The top state controller is responsive to the first or second flag to operate the bus adapter to that master top state which set the first flag and is responsive to the completion of the suspended command to clear the first and said second flags.

Features of the present invention include resolution of deadlock conditions, establishment of priorities between the local and system buses, and suspension of the master state to permit handling of slave state commands.

One feature of the present invention resides in the fact that data handling devices connected to the local bus are capable of assuming master and slave substates for local communication between the data handling devices without regard to the state of the bus adapter.

Another feature of the present invention resides in the provision of a control mechanism for the interface between different types of buses.

DETAILED DESCRIPTION OF THE PREFERRED EMBODIMENTS

Figure 1:
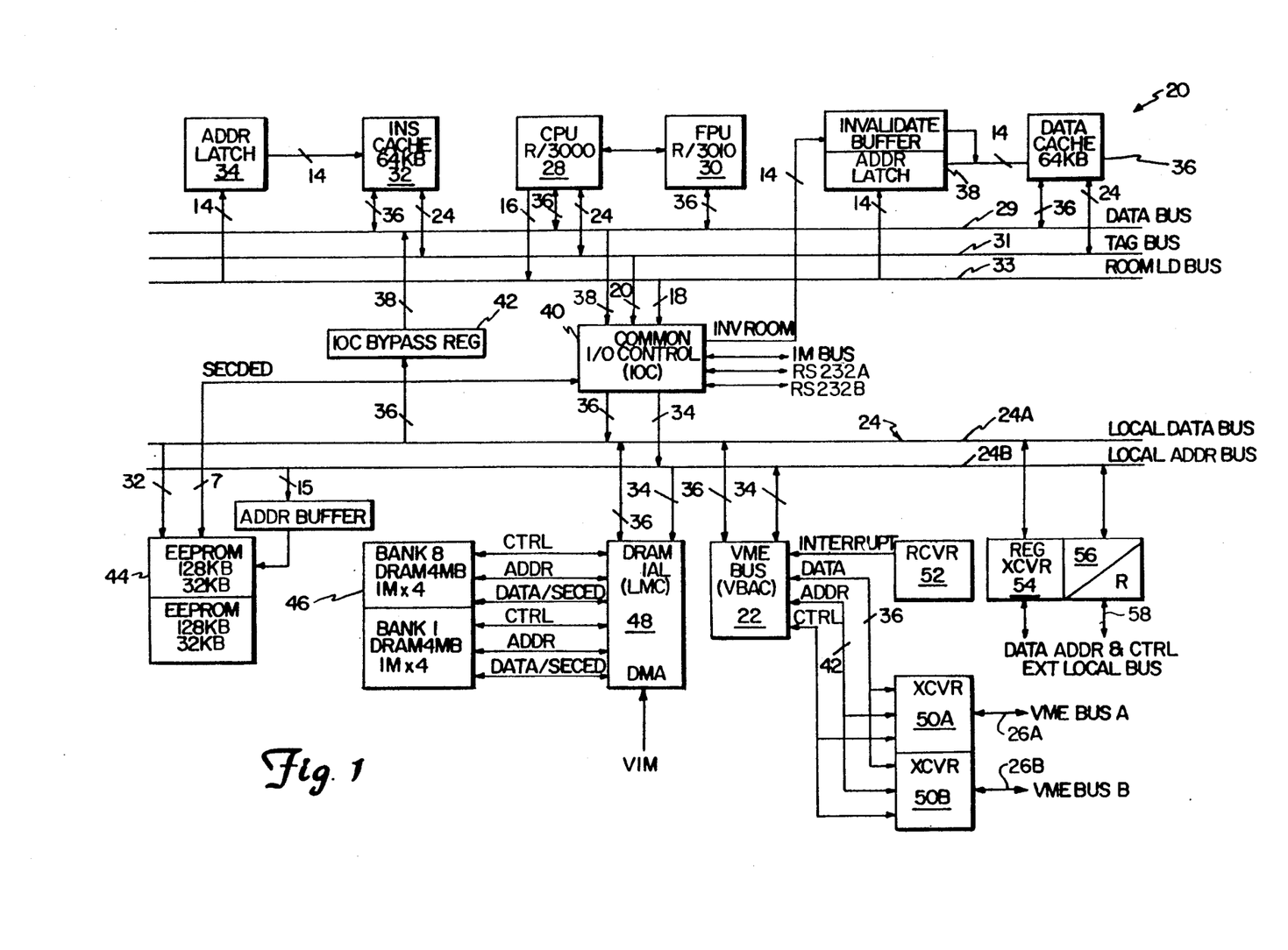
FIG. 1 is a schematic diagram of a computer platform incorporating a bus adapter architecture according to the present invention.

The present invention provides a general architecture for bus adapters which function as an interface between two different types of buses, and more particularly provides a top level state controller for controlling the top level state of a bus adapter. FIG. 1 illustrates a data processing or computer platform 20 which utilizes the present invention. VMEbus adapter chip (VBAC) 22, which incorporates the present invention, provides an interface between local bus 24 and two VMEbuses 26A and 26B. A VMEbus or Versatile Backplane Bus is a standard system bus commonly used in computer systems. Local bus 24 comprises local data bus 24A and local address bus 24B. VBAC 22 utilizes the bus adapter architecture according to the present invention.

Local bus 24 communicates between devices within computer platform 20. External or system VMEbuses 26A and 26B communicate to other modules in a total system. The other modules may be configured like platform 20 and include a VBAC 22. Devices attached to local bus 24 are illustrated schematically in FIG. 1. Central processing unit (CPU) 28 communicates over data bus 29, tag bus 31, and address bus 33. Floating-point coprocessor (FPU) 30 communicates over data bus 29 and has control lines directly connected to CPU 28. Instruction cache 32 communicates via data bus 29 and tag bus 31 and through address latch chip 34 to address bus 33. Likewise, data cache 36 communicates via data bus 29 and tag bus 31 and through address latch and invalidate buffer chip 38 to address bus 33. Input-/output control (IOC) chip 40 provides local bus arbitration of communication and control between local bus 24 and the data bus 29, tag bus 31, and address bus 33. A test and maintenance serial bus and a RS232 industry standard low speed interface for devices such as a program console, are connected through IOC chip 40 to local bus 24. An IOC bypass register 42 provides a direct path from local data bus 24A to data bus 29. Electronically erasable programmable ROM (EEPROM) 44 is also connected to local bus 24. Additionally, local DRAM memory 46 is connected to local bus 24 via DRAM control chip 48. Thus, DRAM control chip 48 provides a direct memory access (DMA) via local bus 24. Transceivers 50A and 50B provide the data, address, and control to and from VMEbuses 26A and 26B to and from VBAC 22. Receiver 52 provides interrupts to VBAC 22. Receivers/transceivers 54 and 56 provide data, address, and control from local bus 24 to external local bus 58.

One embodiment of VBAC 22 is implemented in an LSI logic 100K compacted array. The particular LSI 100K array used is a LCA100135 array which typically has about 58,000 usable gates out of 135,042 total gates. The LSI 100K array has 340 pins of which 336 can be bonded to pads on the die. The array package supports 262 I/O signal pads, with the remaining pads allocated to power and ground pins. Consequently, the LSI 100K array accommodates VBAC 22 for functions with approximately 53,000 gates and 234 signal pins. Such an embodiment of VBAC 22 provides VME master control, VME slave control, VMEbus arbitrator control, VMEbus interrupter control, VMEbus interrupt handler control, and VME block transfer capability. In addition, interprocessor mailbox interrupts, interprocessor communication semaphores, DMA control, first in first out (FIFO) buffers, test logic, and edge-triggered discrete interrupts are provided by VBAC 22.

VBAC 22 contains several internal registers to establish various options and to allow monitoring of status. These registers are readable from local bus 24 or VMEbuses 26. VBAC 22 control registers are designed to reset to values which support most stand-alone configurations. Certain configurations of computer platform 20 might not include IOC chip 40. In such configurations, a local bus grant pin on VBAC 22 is grounded to indicate that no other local bus masters are permitted. If the reset register values are not correct, data handling devices are required to initialize VBAC registers to the desired state.

VBAC 22 supports all of the standard VMEbus single word read and write modes. These modes include byte (8-bit), half-word (16-bit), tri-byte (24-bit), and word (32-bit) transfers. Software is provided to performs single partial word write functions differently due to the possibility of a byte gathering condition of a write buffer in IOC chip 40. Byte gathering might occur in execution of partial word write functions to VBAC 22 which are not supported by the VMEbuses, such as a two-byte write function where non-consecutive bytes are written. Thus, the software insures that such byte gathering cannot occur by insuring that successive partial words to be written do not share the same word address or by testing and waiting for a write buffer empty signal after each partial word write. If an illegal combination occurs, a specification error bit is set in an interrupt status register. No partial word problems exist with DMA transfers because DMA transfers do not utilize the IOC 40 write buffer.

The three address VMEbus modes are short (16-bit), standard (24-bit) and extended (32-bit) addresses. VBAC 22 can generate all three VMEbus addressing modes when VBAC 22 functions in a VMEbus master mode. When VBAC 22 functions in a slave mode, VBAC 22 only responds to VME transfers which are in the extended mode. Also, in the master mode, VBAC 22 generates addresses with either supervisor or non-privilege mode set. In a slave mode, VBAC 22 checks the address privilege status and uses the status to control access to local memory. Finally, in a master mode, VBAC 22 generates addresses in either the data or program space. In a slave mode, VBAC 22 does not distinguish between data or program spaces.

The function of VBAC 22 as explained above is illustrated generally in block diagram form in FIGS. 4A-4D.

A hierarchy of state units provide control of the VBAC 22 chip. A top level state machine (TLSM) for VBAC 22 is functionally illustrated at 100 in FIG. 2. TLSM 100 is not concerned With the details of the translation of protocols between the local and system buses. Instead, TLSM 100 enables one and only one substate unit at a time. The substate units perform the substate details of bus to bus transactions. Thus, the present invention is directed to a hierarchy of state units with TLSM 100 providing overall control of operations.

Figure 2:
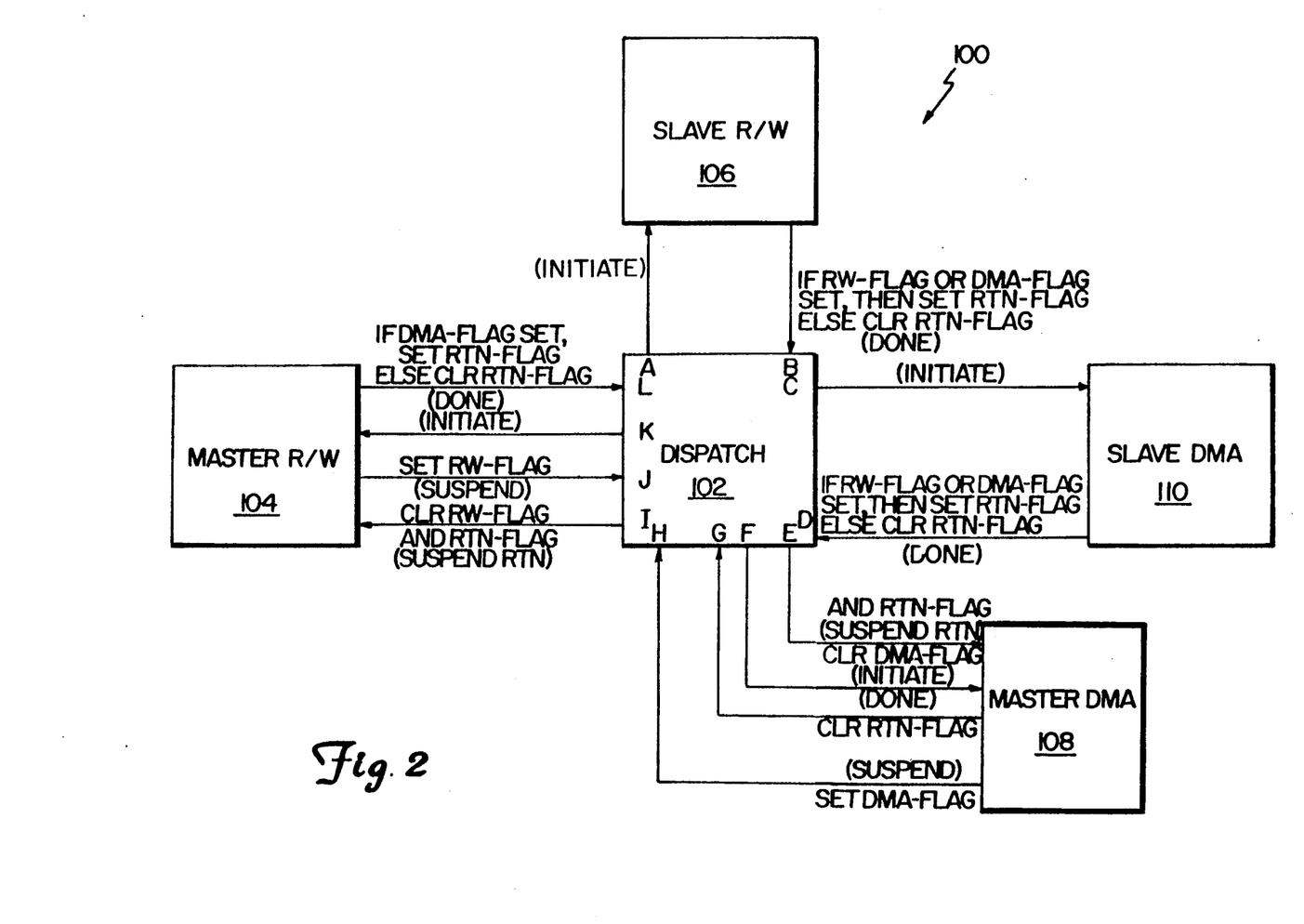
FIG. 2 is a block functional diagram of a top level state controller for a bus adapter according to the presently preferred embodiment of the present invention.

As shown in FIG. 2, TLSM 100 will always be in one and only one of five states. Each state corresponds to a particular mode of operation for implementing a processor local bus to VMEbus adapter. A dispatch state 102 occurs when no bus operation is being requested and TLSM 100 is idle. Active bus operations fall into either a master operation or a slave operation. The master operations, with respect to TLSM 100, are defined as external VMEbus operations which are initiated by the module containing the VBAC 22 which is controlled by TLSM 100. The slave operations, with respect to TLSM 100, are defined as the external VMEbus operations which are initiated by an external module. Thus, a master module is one which requests and is granted the VMEbus. A slave module is one which is selected by a master module in response to the master's bus operation. The master and slave operations are further divided into other types of operations such as read or write, and single word or block transfers. In the preferred form of the invention, TLSM 100 has a single word master read/write (R/W) state 104 and a corresponding single word slave R/W state 106, and a block transfer master DMA state 108 and a corresponding block transfer slave DMA state 110. Other non-dispatch states are possible, but only the four active states are needed for the TLSM 100 used for a processor local bus to VMEbus adapter.

The non-dispatch states enable the startup of one of the substate units which carries out the requested operation. In addition, the particular TLSM state itself is useful for forming transmitter enable and direction signals to pass data, address, and control signals between the local and system bus. Moreover, an active TLSM state prevents the TLSM from assuming other active or inactive TLSM states until suspended or completed. When a substate unit operation is completed, the substate unit exits and forces TLSM 100 to return to dispatch state 102.

Twelve entry and exit points (A-L) into and out of dispatch state 102 from the master and slave states are illustrated in FIG. 2. Exit point A is an initiate into slave R/W state 106, exit point C is an initiate into slave DMA state 110, exit point F is an initiate into master DMA state 108, and exit point K is an initiate into master R/W state 104. Entry point B is an entry into dispatch state 102 when slave R/W state 106 is done, entry point D is an entry into dispatch state 102 when slave DMA state 110 when done, entry point G is an entry into dispatch state 102 when master DMA state 108 is done, and entry point L is an entry into dispatch state 102 when master R/W state 104 is done. Entry point J is an entry into dispatch state 102 from a suspended master R/W operation, and entry point H is an entry into dispatch state 102 from a suspended master DMA operation. Exit point I is a return from dispatch state 102 to a suspended master R/W operation, and exit point E is a return to a suspended master DMA operation.

Figure 3:
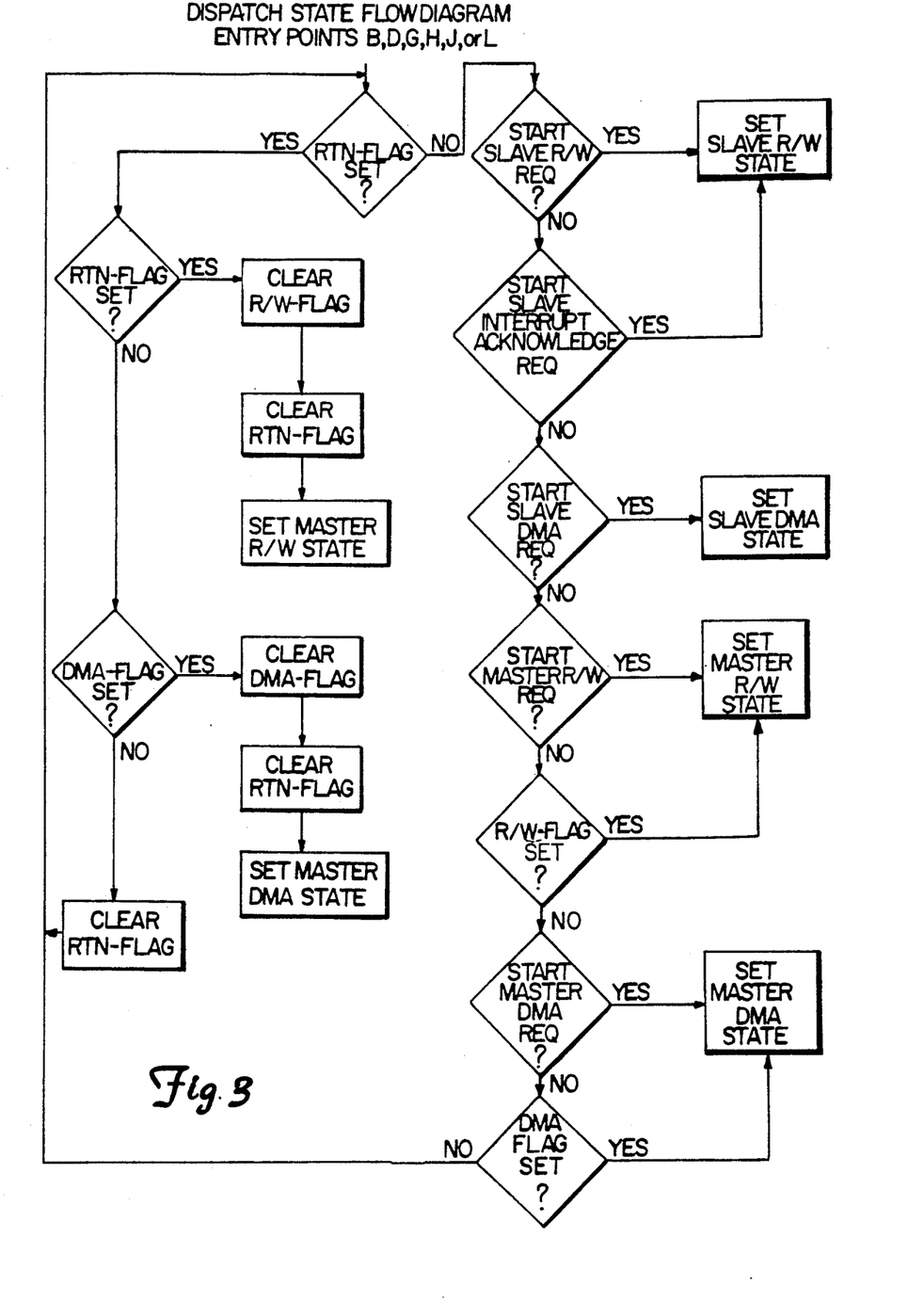
FIG. 3 is a detailed flow diagram showing entry and exits of a dispatch state of a top level state controller of the present invention.
Figure 4A:
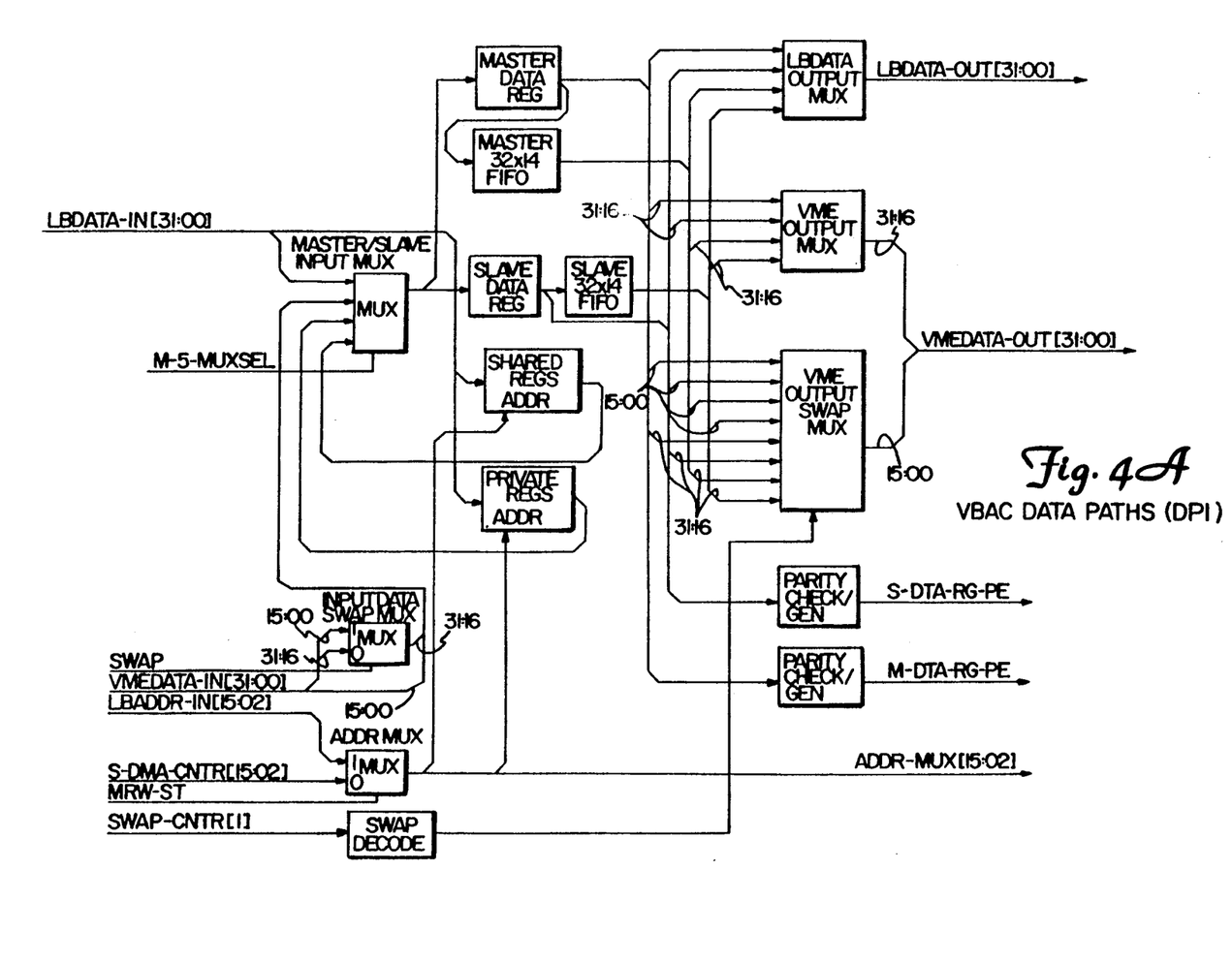
FIGS. 4A-4D are block diagrams of a bus adapter incorporating the bus adapter architecture according to the present invention.
Figure 4B:
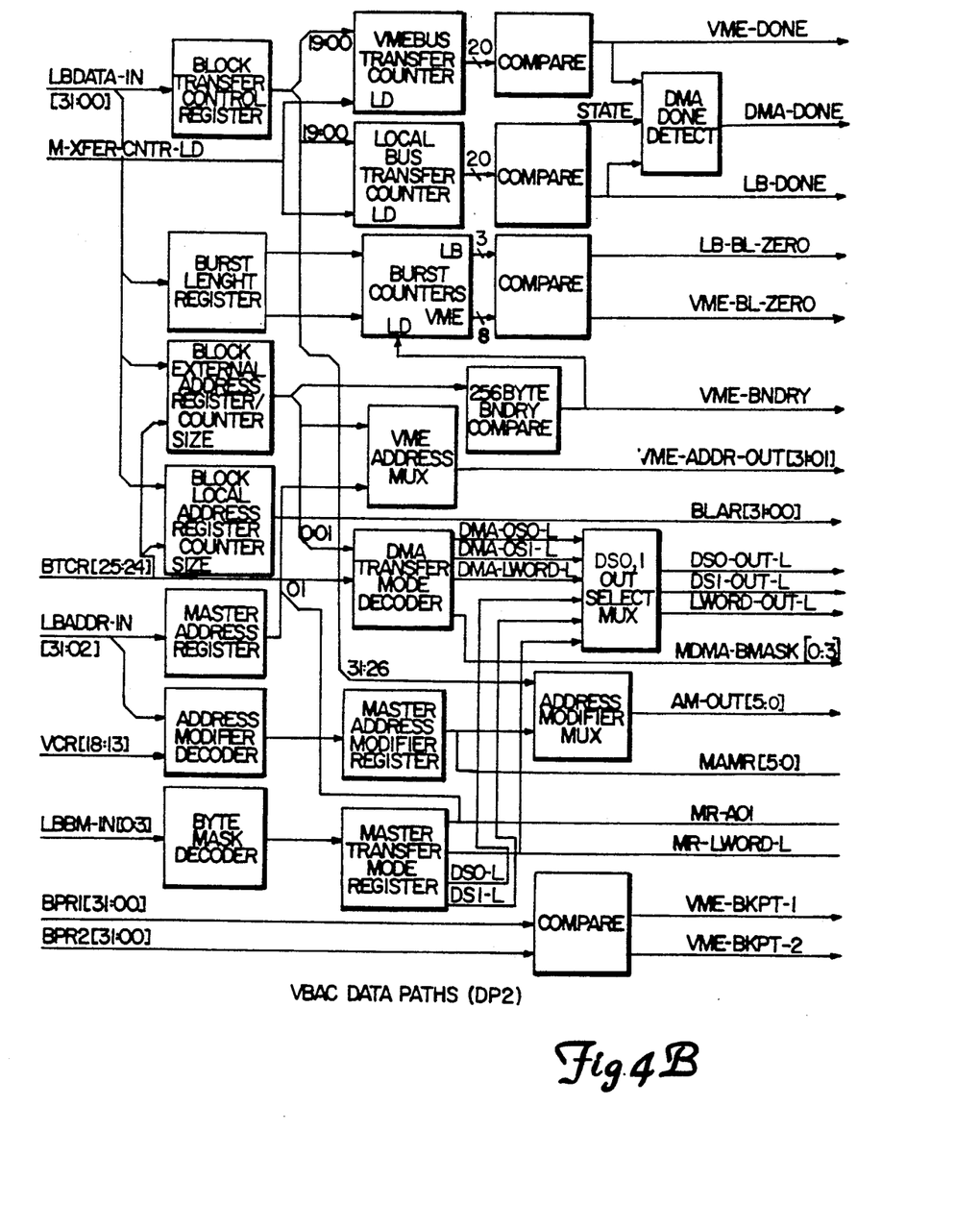
Figure 4C:
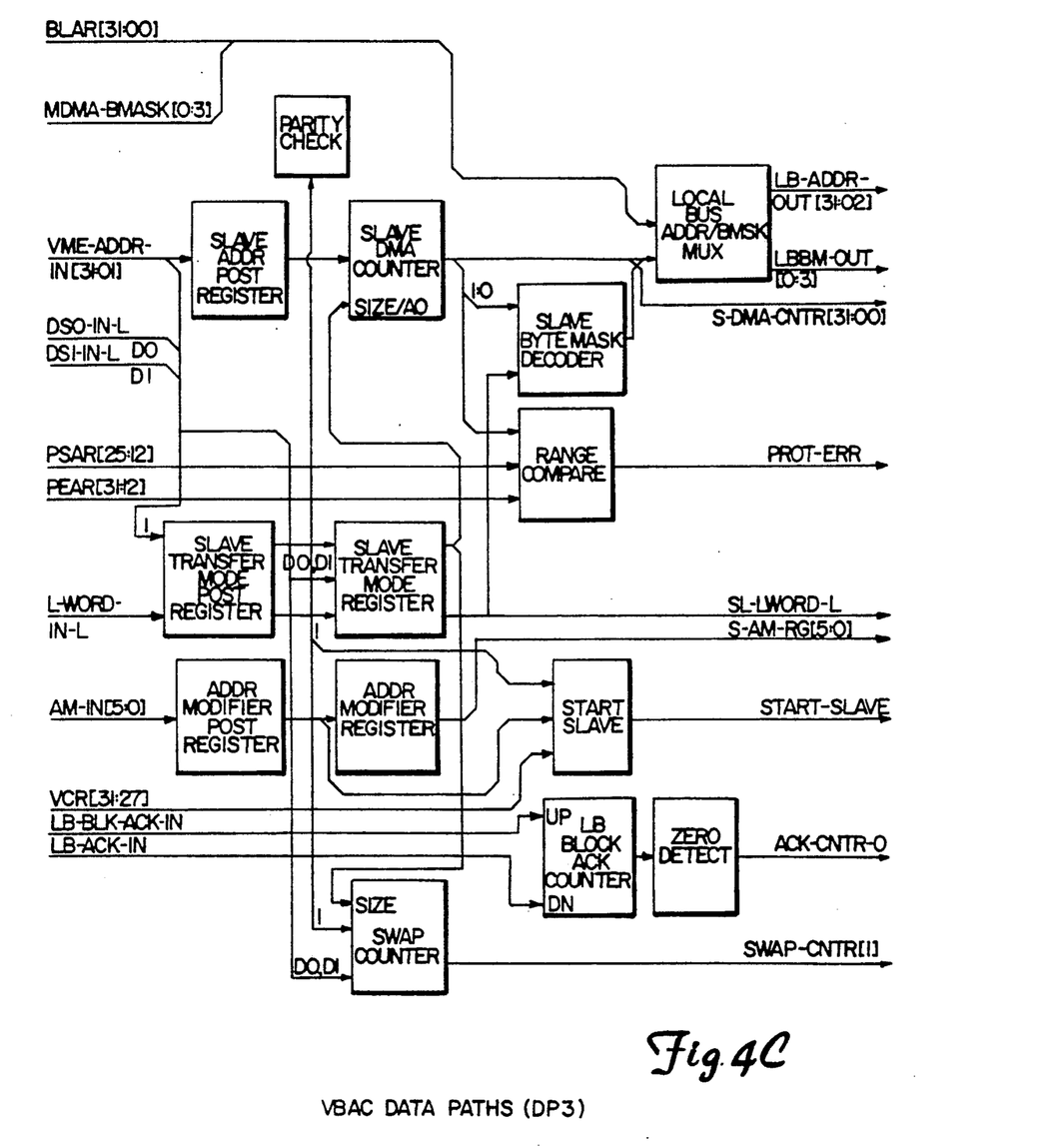
Figure 4D:
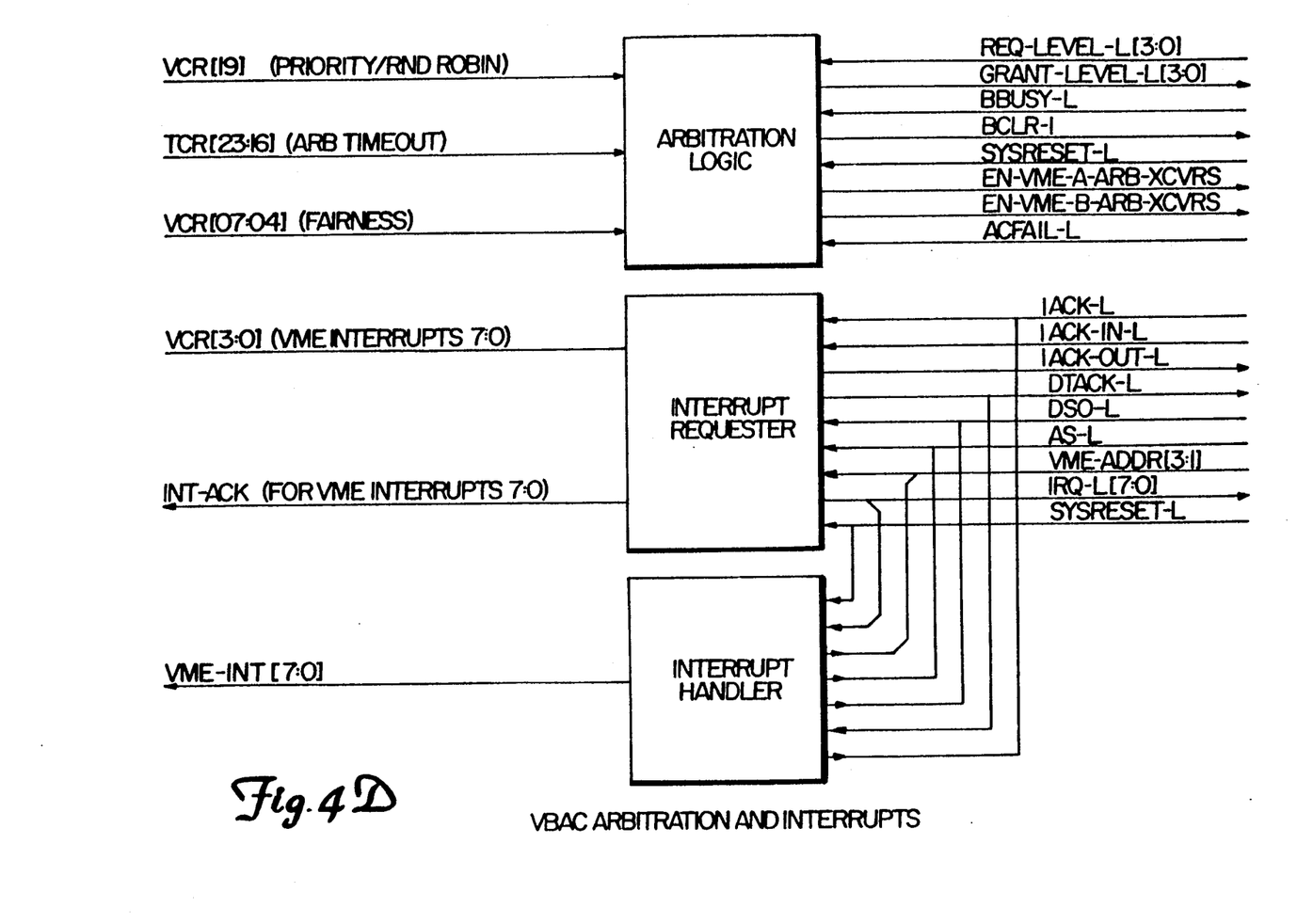

FIG. 3 illustrates dispatch state 102 which is entered from points B, D, G, H, J, or L as illustrated in FIG. 2. The action performed by TLSM 100 in the dispatch state is partially controlled with a RTN_FLAG, a R/W_FLAG, and a DMA_FLAG, which are set and cleared during transitions between the five states. If the RTN_FLAG is not set, then TLSM 100 is not returning to a suspended master operation. Therefore, when the RTN_FLAG is not set, dispatch state 102 looks at the request for slave and master operations. If a start slave R/W request or a start slave interrupt acknowledge is requested, then TLSM 100 will enter the slave R/W state. The interrupt acknowledge essentially is a status word read operation. If a request is not made for a slave R/W state operation, and if a start slave DMA request is made, then TLSM 100 will enter the slave DMA state. If no slave state is requested, and a start master R/W request is made, then TLSM 100 will enter the master R/W state.

If the R/W_FLAG is set, TLSM 100 will enter the master R/W state providing an orderly method to enter the master R/W state and retry a suspended master R/W operation. If a master read/write request is not made, and a master DMA operation is requested, TLSM 100 will enter the master DMA state. If the DMA_FLAG is set, TLSM 100 will enter the master DMA state providing an orderly method to enter the master DMA state and retry the suspended master DMA operation.

If no requests are made for either slave or master states, TLSM 100 will remain in dispatch state 102 and continue to cycle through the dispatch state looking for slave and master R/W and DMA requests. Thus, dispatch state 102 provides a priority mechanism for multiple requests by starting with the highest priority accorded to a slave R/W request and sequencing through to the lowest priority master DMA request.

An RTN_FLAG set condition indicates that TLSM 100 is returning to a suspended master operation. Therefore, with the RTN_FLAG set, TLSM 100 first looks at the R/W_FLAG. If the R/W_FLAG is set, dispatch state 102 clears the R/W_FLAG and the RTN_FLAG and enters the master R/W state. If the R/W_FLAG is not set and the DMA_FLAG is set, dispatch state 102 clears the DMA_FLAG and the RTN_FLAG and enters the master DMA state. If neither the R/W_FLAG nor the DMA_FLAG is set, then the RTN_FLAG is cleared and TLSM 100 stays in dispatch state 102.

As shown in FIG. 2, when TLSM 100 exits from slave R/W state 106, the RTN_FLAG is set if the R/W_FLAG or the DMA_FLAG is set then the RTN_FLAG is set. Otherwise the RTN_FLAG is cleared. Similarly, when TLSM 100 exits from slave DMA state 110, RTN_FLAG is set if the R/W_FLAG or the DMA_FLAG is set. Otherwise the RTN_FLAG is cleared. The RTN_FLAG is always cleared when TLSM 100 exits from master DMA state 108 after completing a DMA operation. When exiting from master R/W state 104 after a completed master R/W operation, the RTN_FLAG is set if the DMA_FLAG is set. Otherwise the RTN_FLAG is cleared.

Figure 5:
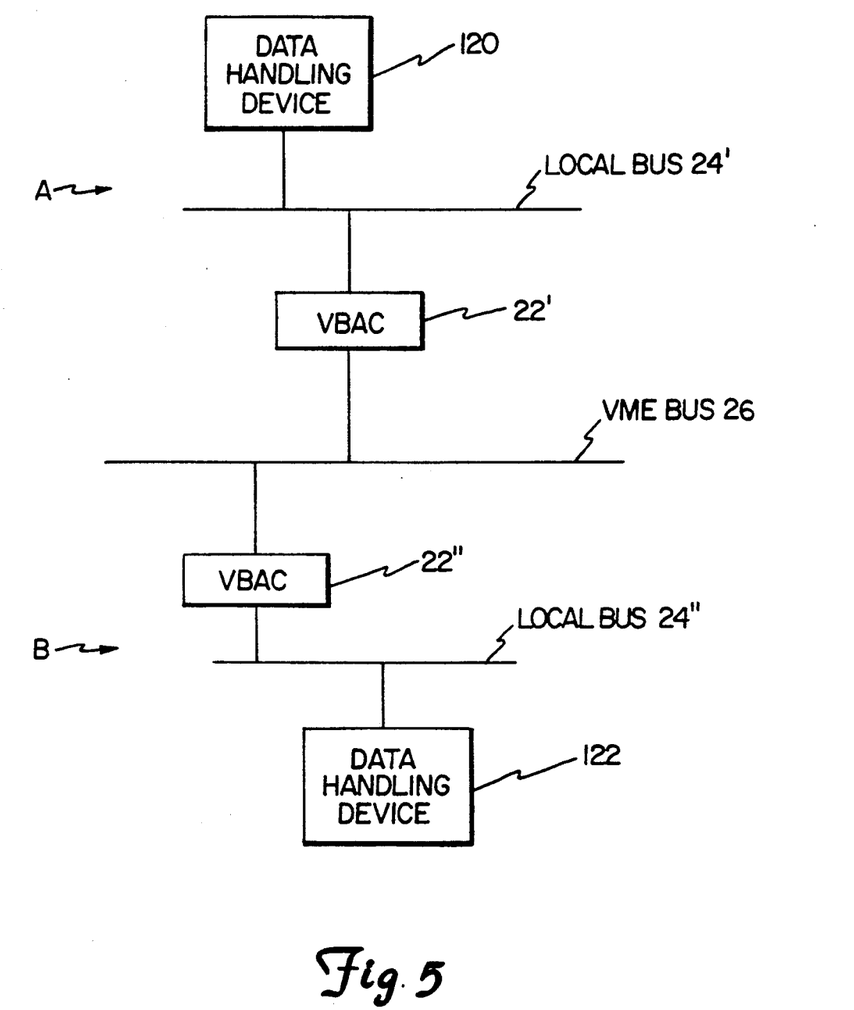
FIG. 5 is a block circuit diagram of a system of two computer platforms incorporating the bus adapter architecture according to the present invention.

FIG. 5 illustrates a deadlock situation where two independent buses interact with each other. Assume module B has access to system bus 26 to access local bus 24' of module A. Assume further that module A is attempting to initiate a transfer to system bus 26. A deadlock occurs because module B has access to system bus 26 for direction to module A's local bus. Thus, module A is trying to gain access to system bus 26 at the same time that system bus 26 is trying to gain access to module A's local bus. One of either module A or module B must terminate its transaction to permit the other module access to the system bus. If the bus adapter simply aborts one of the system bus transactions, then TLSM 100 can return to dispatch state 102 and from dispatch state 102, go to the proper state for the remaining non-aborted bus operation. The aborted operation is subsequently reissued on the bus and is no different from a non-aborted operation.

High performance systems, however, utilize write operations which are usually posted. A posted write operation is one in which a write address and data are captured in registers and a completion response is sent immediately to the initiating bus. Contemporaneously, a request is made for mastership of the other bus to actually do the requested write operation. If a deadlock occurs during a posted write operation, then no actual bus operation exists that can be aborted. In the present invention, TLSM 100 resolves the deadlock situations for high performance systems.

TLSM 100 resolves deadlock by supporting the suspend operation from master states 104 and 108. Only master states support the suspend operation because an assumption is made that the local bus supports a back-off operation and the system bus such as a VMEbus does not support a back-off operation. When TLSM 100 and the substate unit detect a deadlock, the substate unit exits with a suspend operation. The suspend operation returns TLSM 100 to dispatch state 102 while setting the R/W_FLAG if TLSM 100 is exiting from master R/W state 104 or setting the DMA_FLAG if TLSM 100 is exiting from master DMA state 108. TLSM 100 then proceeds to the appropriate slave state to execute the system bus request and clear the deadlock condition. When the slave substate unit completes the operation and the R/W_FLAG or the DMA_FLAG is set, TLSM 100 exits from the slave state, sets the RTN_FLAG, and returns to dispatch state 102. TLSM 100 uses the RTN_FLAG to indicate that TLSM 100 should return to a suspended substate unit. If the R/W_FLAG is set, TLSM 100 returns to master R/W state 104 whereas if the DMA_FLAG is set, TLSM 100 returns to master DMA state 108. TLSM 100 clears the RTN_FLAG and the R/W_FLAG when returning to suspended master R/W state 104, and clears the RTN_FLAG and the DMA_FLAG when returning to suspended master DMA state 108.

To exemplify the suspension of a master state, as shown in FIG. 5, a data handling device 120 (which may, for example, be a CPU, data cache, or other data handling apparatus of a data processing platform 20) is connected through the local bus 24' and VBAC 22' of the platform of module A to VMEbus 26. Likewise, module B includes data handling device 122 which is connected through local bus 24" and VBAC 22" to VMEbus 26. If data handling device 120 has issued a command to data handling device 122, device 120 and its associated VBAC 22' are operating in a master state. In addition, if data handling device 122 has issued a command to data handling device 120 and has been granted the system bus, then data handling device 122 and its associated VBAC 22" are also operating in a master state. When the device 120 operation is suspended, VBAC 22' sets the R/W_FLAG or DMA_FLAG (as the case may be) and exits the master state to the dispatch state. If neither the R/W_FLAG nor the DMA_FLAG is set at the VBAC 22", any RTN_FLAG in VBAC 22" is cleared as that unit exits the slave state into the dispatch state. VBAC 22' is now ready to execute in a slave state. Upon completion of the slave operation and exit back to the dispatch state, the RTN_FLAG is set and VBAC 22' returns to the master state which set the R/W_FLAG or DMA_FLAG. Hence, the VBAC will return to the suspended master state to complete the command.

As shown in FIG. 1, VBAC 22 synchronizes asynchronous operations in implementing the local bus to the VMEbus adapter. By assuring that TLSM 100 is always in one and only one of five states, VBAC 22 synchronizes operations from the start and completion of each of the five states. For example, when CPU 28 operates as a master, the VBAC 22 associated with CPU 28 may be currently operating as a master or slave. VBAC 22 will not respond to the CPU master request until the current slave or master operation is completed. The master request will then only be accommodated by following the priority scheme as explained above and illustrated in the dispatch state flow diagram of FIG. 3. Moreover, VBAC 22 substantially eliminates saturation problems on local bus 24 during DMA master operations by utilizing the suspend operation. During a master DMA operation, substate units under master DMA state 108 observes TLSM 100 for other read and write requests. If there are other read/write requests, master DMA 108 issues a suspend operation and waits for completion of the DMA operation until the read/write operation completes and sets the RTN_FLAG to return to the suspended master DMA operation. Although some operations on local bus 24 may be independent of VBAC 22, VBAC 22 provides a structured approach to handling data transfers between local bus 24 and VMEbuses 26A and 26B.

The present invention provides a hierarchical bus adapter architecture which eliminates many of the problems with previous bus adapter architectures in coordinating the use of resources, prioritizing operations, and handling deadlock conditions. Moreover, the present invention provides a structured design which simplifies simulation and allows for a more complete validation of the design. More particularly, the present invention assures that TLSM 100 is always in a well defined state, that usage is allocated amongst multiple substate units, and that operations are prioritized for multiple requests. Moreover, TLSM 100 provides recovery from deadlock conditions caused by certain conflicting transaction combinations. The present invention provides a hierarchical structured design which is capable of simplified design simulation and validation and less likely to fault. Control logic algorithms are simplified for each top level state, thereby making a bus adapter according to the present invention easier to characterize, understand, document and modify.

Although the present invention has been described with reference to preferred embodiments, workers skilled in the art will recognize that changes may be made in form and detail without departing from the spirit and scope of the invention.

What is claimed is:

1. In a computer system having a system bus connected to a plurality of data processing platforms, each platform including a local bus and a plurality of data handling devices connected to the local bus to execute operations, each data handling device being capable of assuming at least a master state or a slave state, and each platform further including a bus adapter for transferring data between the local bus and the system bus in response to commands, the bus adapter assuming a selected one of at least a dispatch state, a master top state, and a slave top state, wherein the improvement comprises, at each platform, a top state controller for controlling the state of the bus adapter, the top state controller including:

means responsive to a command on the local bus or on the system bus during a dispatch state of the bus adapter for changing the state of the bus adapter to a selected master or slave top state, said bus adapter remaining in the selected top state until the command is completed or suspended, said bus adapter returning to the dispatch state upon completion or suspension of the command;

means for setting a first flag in response to a change of state of the bus adapter from a master top state to the dispatch state and to the suspension of a command by a data handling device connected to the local bus;

means for setting a second flag in response to a change of state of the bus adapter from a slave top state to the dispatch state and to the completion of an execution by the data handling device and to the set state of the first flag;

means responsive to the first flag to change the state of the bus adapter to that master top state from which the bus adapter changed to set the first flag and being responsive to the second flag to change the state of the bus adapter to that master top state from which the bus adapter changed to set the first flag; and means responsive to the completion of a suspended command to clear the first flag and said second flag.

2. The apparatus of claim 1 wherein the top state controller is responsive to a cleared condition of the first flag and the completion of a command by any data handling device to clear the second flag.

3. The apparatus of claim 1 wherein the master and slave top states are assigned selected priorities, and the top state controller includes means responsive to plural commands to execute the command for the top states having the highest priority.

4. The apparatus of claim 1 wherein the top state controller includes means responsive to a deadlock condition to suspend command of the master top state of the bus adapter and change the state of the bus adapter to its dispatch state.

5. The apparatus of claim 1 wherein the top state controller includes means responsive to a command for a slave top state to suspend commands of the master top state of the bus adapter and change the state of the bus adapter to its dispatch state.

6. The apparatus of claim 1 wherein the data handling devices connected to the local bus assume master and slave substates for local bus communications regardless of the top state of the bus adapter.

7. A top state controller for controlling a bus adapter of a computer system, the bus adapter transferring data between a local bus and a system bus, the local bus connecting a plurality of data handling devices each capable of assuming at least a master state or a slave state, the bus adapter assuming a selected one of at least a dispatch state, a master top state, and a slave top state, said top state controller comprising:

means for changing the state of the bus adapter to a selected master or slave top state in response to a command on the local bus or system bus during a dispatch state of the bus adapter, said bus adapter remaining in the selected top state until the command is completed or suspended;

means for returning the bus adapter to its dispatch state upon completion or suspension of a command;

means for setting a first flag in response to a change of state of the bus adapter from a master top state to the dispatch state in response to suspension of a command by a data handling device;

means for setting a second flag upon a change of state of the bus adapter from a slave top state to the dispatch state in response to the completion of an execution by the data handling device and the set state of the first flag;

means responsive to the first flag to change the state of the bus adapter to that master top state from which the bus adapter changed to set the first flag and responsive to the second flag to change the state of the bus adapter to that master top state from which the bus adapter changed to set the first flag; and a means responsive to the completion of a suspended command to clear the first flag and said second flag.

8. The apparatus of claim 7 including means responsive to a cleared condition of the first flag and to the completion of a command by any data handling device to clear the second flag.

9. The apparatus of claim 7 wherein the master and slave top states are assigned selected priorities, and the top state controller includes means responsive to plural commands to execute the command for the top states having the highest priority.

10. The apparatus of claim 7 further including means responsive to a deadlock condition to suspend commands of the master top state of the bus adapter and to change the state of the bus adapter to its dispatch state.

11. The apparatus of claim 7 further including means responsive to a command for a slave top state to suspend command of the master top state of the bus adapter and to change the state of the bus adapter to its dispatch state.

12. The apparatus of claim 7 wherein the data handling devices assume master and slave substates for local bus communications without regard to the top state of the bus adapter.

* * * * *

UNITED STATES PATENT AND TRADEMARK OFFICE
CERTIFICATE OF CORRECTION

PATENT NO. : 5,305,442

DATED : April 19, 1994

INVENTOR(S) : DERALD A. PEDERSEN; JAMES A. DAHLBERG

It is certified that error appears in the above-identified patent and that said Letters Patent is hereby corrected as shown below:

Col. 3, line 65, delete "With", insert --with--

Signed and Sealed this

Ninth Day of August, 1994

Attest:

BRUCE LEHMAN

Attesting Officer

Commissioner of Patents and Trademarks